(12) United States Patent
Gruijters et al.

(10) Patent No.: US 8,108,651 B2
(45) Date of Patent: Jan. 31, 2012

(54) PROGRAMMABLE SIGNAL PROCESSING CIRCUIT AND METHOD OF INTERLEAVING

(75) Inventors: Paulus W. F. Gruijters, Eindhoven (NL); Marcus M. G. Quax, Eindhoven (NL); Ingolf Held, Eindhoven (NL)

(73) Assignee: Silicon Hive B.V., Eindhoven (NL)

(*) Notice: Subject to any disclaimer, the term of this patent is extended or adjusted under 35 U.S.C. 154(b) by 596 days.

(21) Appl. No.: 11/721,052

(22) PCT Filed: Dec. 13, 2005

(86) PCT No.: PCT/IB2005/054203
§ 371 (c)(1),
(2), (4) Date: Sep. 28, 2009

(87) PCT Pub. No.: WO2006/064462
PCT Pub. Date: Jun. 22, 2006

(65) Prior Publication Data
US 2010/0039567 A1    Feb. 18, 2010

(30) Foreign Application Priority Data
Dec. 14, 2004 (EP) .................................. 04106549

(51) Int. Cl.
*G06F 12/06* (2006.01)
*H04N 7/12* (2006.01)
(52) U.S. Cl. ............. 711/220; 711/217; 375/240.26
(58) Field of Classification Search .............. None
See application file for complete search history.

(56) References Cited

U.S. PATENT DOCUMENTS

| | | | | |
|---|---|---|---|---|
| 2003/0118127 | A1* | 6/2003 | Peting | 375/316 |
| 2003/0133514 | A1* | 7/2003 | Lais et al. | 375/260 |
| 2003/0147479 | A1* | 8/2003 | Shah et al. | 375/341 |

FOREIGN PATENT DOCUMENTS

EP    0 965 911 A2    12/1999
(Continued)

OTHER PUBLICATIONS

Horvath et al. "A Novel, High-Speed, Reconfigurable Demapper-Symbol Deinterleaver Architecture For DVB-T" Circuits and Systems 1999, ISCAS '99. Proceedings of the 1999 IEEE International Symposium on Orlando, FL., USA, IEEE, US, vol. 4, May 30, 1999, pp. 382-385.

Richter et al., "Parallel Interleaving On Parallel DSP Architectures," Signal Processing Systems, 2002. (SIPS '02), IEEE Workshop on Oct. 16-18, 2002, Piscatway, NJ, USA, IEEE, Oct. 16, 2002, pp. 195-200.

(Continued)

*Primary Examiner* — Than Nguyen
(74) *Attorney, Agent, or Firm* — Leydig, Voit & Mayer, Ltd.

(57) ABSTRACT

A programmable signal processing circuit is used to (de-)interleave a data stream. Data from the signal stream is stored in a data memory (28) and read in a different sequence. The programmable signal processing circuit is used for computing addresses, for use in said storing and/or reading. The programmable signal processing circuit has an instruction set that contains an instruction to compute the addresses from preceding addresses that have been used for said storing and/or reading. In response to the instruction the programmable signal processing circuit permutes positions of a plurality of bits from the old address operand and forms of a bit of the new address result as a logic function of a combination of bits from the old address operand. Successive addresses are formed by means of repeated execution of a program loop that contains an address update instruction for computing the addresses.

10 Claims, 3 Drawing Sheets

FOREIGN PATENT DOCUMENTS

| | | |
|---|---|---|
| EP | 1 828 884 B1 | 8/2010 |
| JP | 07-049779 A | 2/1995 |
| JP | 11-203106 A | 7/1999 |
| JP | 2000-295117 A | 10/2000 |

OTHER PUBLICATIONS

International Search Report for PCT/IB2005/054203 dated Jun. 14, 2006.

* cited by examiner

PROGRAMMABLE SIGNAL PROCESSING CIRCUIT AND METHOD OF INTERLEAVING

The invention relates to a method of (de-)interleaving signal information and a to a programmable signal processing circuit for implementing such a method.

The DVB (Digital Video Broadcast) standard provides for transmission of encoded television signals. To decode these signals a number of steps have to be performed, which include de-interleaving of the transmitted signals. De-interleaving involves rearrangement of data units, so that they their relative position in an output sequence differs from that in an input sequence in which the data units occur during transmission. De-interleaving is typically implemented by writing of data units of the received signal into a memory and reading of the data units from the memory in a sequence other than the sequence in which that data was written. When the data units are stored in an addressable memory, de-interleaving is controlled by the selection of addresses that are used for this purpose.

The DVB standard defines an address sequence that can be used for this purpose. The definition involves three sequences of numbers. The numbers of the first sequence are denoted by $R'_i$, wherein i is an index that distinguishes different positions in the sequence. The numbers of the second sequence are denoted by $R_i$ and the numbers of the third sequence are denoted by $H_i$. The DVB standard defines a recursive algorithm by which each successive value $R'_i$ in the first sequence can be computed from a preceding value $R'_{i-1}$. This algorithm involves a shift of the binary representation of $R'_{i-1}$ and the addition of a bit value that is computed as a logic function of selected ones of the bits of the binary representation of $R'_{i-1}$. Next, the DVB standard defines a mapping that maps values $R'_i$ of the first sequence to values $R_i$ in the second sequence. Finally, the DVB standard defines the third sequence $H_i$ as a copy of the second sequence from which all numbers have been omitted that exceed a threshold value. The DVB standard gives three definitions of this type, for use with three different block sizes.

Known implementations of this type of interleaving typically use a dedicated address computation circuit for computing the addresses $R_i$ of the second sequence. Such a circuit contains a register that stores a current value of $R'_i$ of the first sequence, a first circuit for generating a next value $R'_{i+1}$ from the value in the register and a second circuit for forming successive values $R_i$ from successive values $R'_i$ in the register. When a plurality of sequences $R_i$ has to be generated in parallel, a plurality of such circuits is needed in parallel, each with a register that holds the $R'_i$ value for a respective sequence.

An alternative implementation involves the use of a programmable signal processing circuit to compute the addresses Ri. In this case, the values $R'_i$, $R_i$ and $H_i$ are typically stored in operand registers of the signal processing circuit that are addressed by the instructions of the circuit. Due to the bit-manipulation nature of the definition of the series $R'_i$, $R_i$ and $H_i$ the computation of these values typically involves execution of a considerable number of instructions. As an alternative, a look-up table may be used, wherein precomputed $H_i$ values are stored. However this requires the overhead of a look-up table of considerable size.

Another alternative could be to expand the instruction set of the programmable processor with special instructions for performing the computation of successive $R'_i$ values and the computation of $R_i$ values from the $R'_i$ values. In this case one or more functional units are provided in the programmable signal processing circuit for executing these instructions. In essence such functional units would contain the earlier described circuitry from the dedicated circuit for computing $R'_{i+1}$ from $R_i$ and for computing $R_i$ from $R'_i$. That is, one functional unit should contain a shifting circuit in combination with a logic circuit to compute a new bit (computation of R'i from R'i-1), the same or another functional unit would provide for mapping of R' to R (which involves a bit permutation) and finally a comparison circuit is needed to detect valid H values. A general purpose register that is addressed in the instruction can be used for supplying $R'_i$, so that a dedicated register to hold $R'_i$ can be omitted from the functional units. This facilitates compilation of programs for the processor, since the instructions are independent of state information in the functional units. However, it is still desirable to be able to reduce the number of instructions that is needed to perform interleaving even further.

Among others, it is an object of the invention to reduce the number of instruction execution cycles that is needed to perform (de-) interleaving with a programmable signal processing circuit.

Among others, it is an object of the invention to reduce the number of instruction execution cycles that is needed to perform (de-) interleaving with a programmable signal processing circuit in a DVB transmission system.

Among others, it is an object of the invention to provide for a programmable signal processing circuit that makes it possible to reduce the number of instruction execution cycles that is needed to perform (de-) interleaving.

Among others, it is an object of the invention to provide for an efficient method of (de-) interleaving using a programmable signal processing circuit.

A method according to the invention is set forth in Claim 1. In this method addresses for use in said storing and/or reading are computed from preceding addresses that have been used for said storing and/or reading. For this purpose repeated execution of a program loop is used that contains an address update instruction for computing the addresses. In this way the addresses themselves are used to compute new addresses, which means that it is avoided that additional processing time is used for computing addresses $R_i$ from intermediate values R'.

A processor that supports the method contains an instruction processing circuit with an instruction set that contains an address update instruction. The instruction processing circuit comprises a permutation circuit coupled between its operand input and its result output, arranged to controls values of a plurality of bits at respective output bit positions in the new address result dependent on respective bits from respective input positions that are a permutation of the output bit positions, and a combinatorial logic circuit coupled between the operand input and the result output, with inputs coupled to receive bits from respective input bit positions in the old address operand and an output coupled to output a bit to a bit position in the new address result.

In a further embodiment it is determined as part of execution of the address update instruction whether a number represented by the new address result operand exceeds a threshold value. If so a flag result is written that is used in the program loop to condition execution of a further instruction.

In another embodiment repeated address cycles are used during execution of the program loop, each of a same series of addresses for use in said storing and/or reading. The cycles are started implicitly in response to execution of the address update instruction by deviating from said permuting and forming of the bit to form the new address result when the old address operand has a predetermined value.

In embodiments of the instruction processing circuit a comparator circuit is provided with an input coupled to the operand input and the comparator controls a bit substitution circuit to overwrite one or more bits with predetermined bit values when a predetermined address occur.

Preferably, the instruction processing circuit selects between different types of update dependent on the update information that is specified by the address update instruction. Thus, different types of de-interleaving, for example for different DVB block sizes can be supported by the instruction processing circuit.

These and other objects and advantageous aspects of the invention will be illustrated from description of the following figures that show non-limitative examples of the invention.

FIG. 1 shows a signal receiver apparatus, such as a DVB (Digital Video Broadcast) receiver apparatus. The apparatus contains a front end 10, a digital signal processing circuit 12 and a back end 14 connected in cascade. Front end 10 has an input for receiving a video broadcast signal. In operation front end 10 receives the video broadcast signal and retrieves digital information from the signal. Digital signal processing circuit 12 receives the digital information and processes the digital information to form a video data signal. Digital signal processing circuit supplies the video data signal to back end 14, which may generate, for example, display data for a connected video display screen (not shown) or storage data for a connected video recording device (not shown). Back end 14 may contain a video display screen and/or recording device itself for these purposes.

Figure 1:
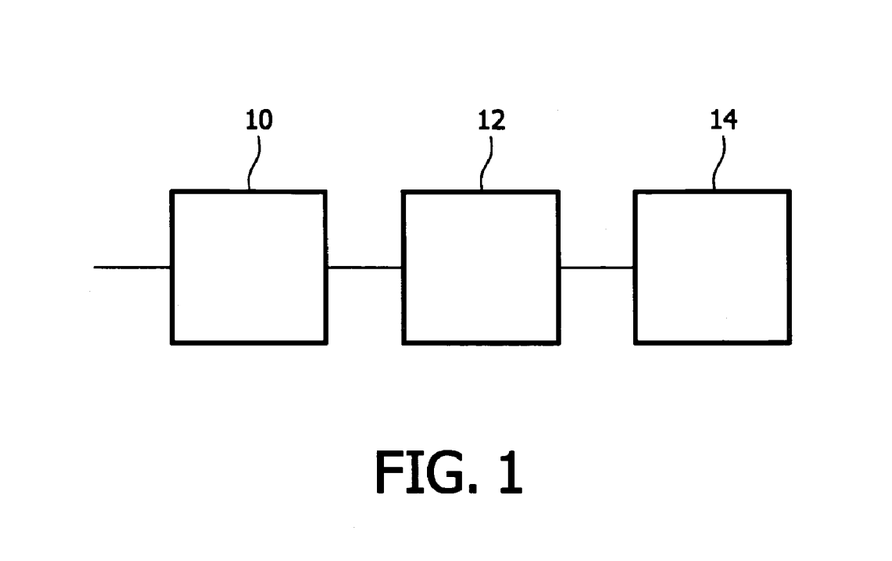
FIG. 1 shows signal receiver apparatus

Digital signal processing circuit 12 comprises a programmable signal processing circuit that is programmed with a program to perform such operations as demodulation (using digital signal samples to reconstruct data items that have been used to modulate the sampled signal) and decoding of demodulated data items according to an Error Correcting Code (ECC).

Prior to decoding digital signal processing circuit 12 de-interleaves the data. Interleaving is used to reduce the vulnerability to burst errors and errors due to interfering signals that cause errors in combinations of demodulated data items. Data items that are vulnerable to such common errors are distributed so that they do not jointly affect the error correction capability of the ECC, e.g. by distributing them over different code words of the ECC. To implement de-interleaving, digital signal processing circuit 12 writes the demodulated data items into a memory and reads the data items back from the memory in a different sequence.

Figure 2:
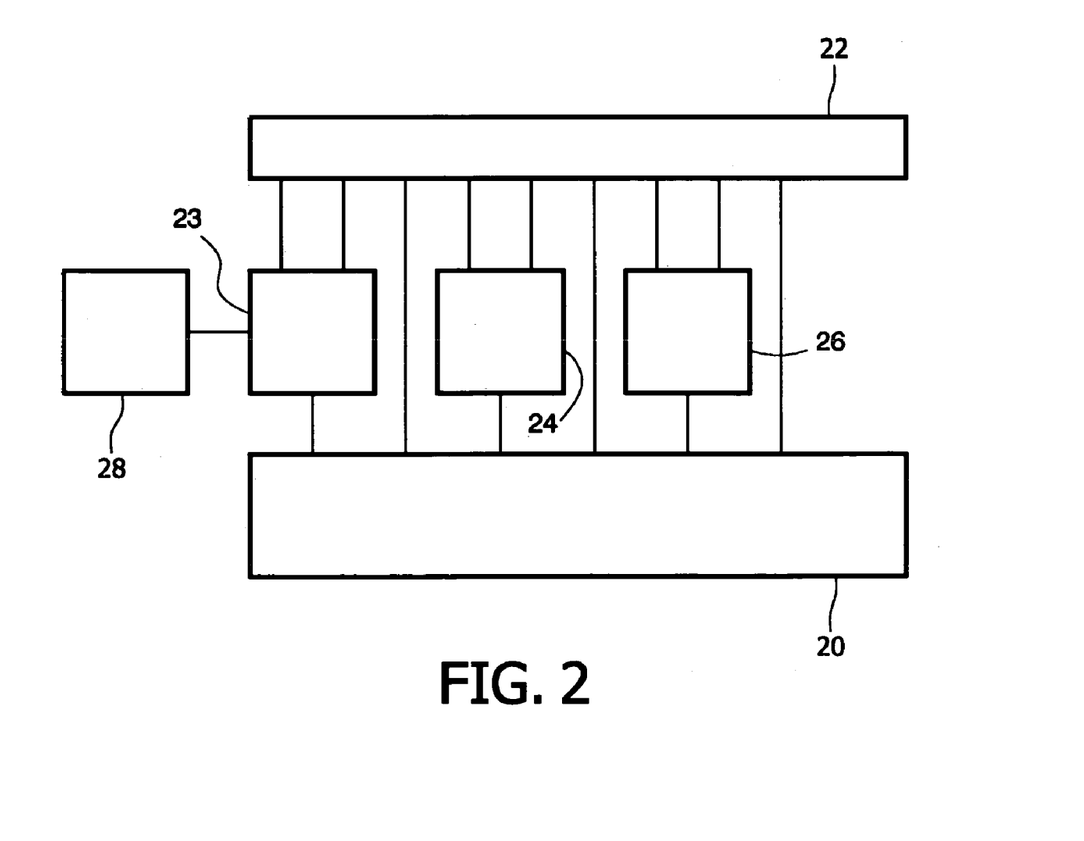
FIG. 2 shows a programmable signal processing circuit

FIG. 2 shows a programmable signal processing circuit from digital signal processing circuit. The programmable signal processing circuit comprises an instruction issue unit 20, a register file 22, a plurality of functional units 23, 24, 26 and a data memory 28. Instruction issue unit 20 stores a program for the digital signal processing circuit, and is arranged to retrieve the instructions as determined by program flow during execution of the program. Instruction issue unit 20 has operation control outputs coupled to functional units 24, 26 for supplying control signals that are determined by the operation codes of the instructions, which identify the operations that must be executed by the functional units 23, 24, 26. Instruction issue unit 20 has register selection outputs coupled to ports of register file 22, for supplying selection signals that indicate the registers that contain operands of the instructions and the registers wherein results of the instructions must be stored. The instructions contain fields that control the selection signals. Output ports of register file 22 are coupled to the functional units 23, 24, 26 for supplying operands from the selected registers and input ports of register file 22 are coupled to the functional units 23, 24, 26 to receive results of execution of the instructions.

Although single lines are shown to indicate communication connections for supplying control codes, register selection codes, operands and results, it will be appreciated that in practice many conductors will be used in parallel in the implementation of such connections. A single line may represent connections for supplying a plurality of register selection codes, or for supplying a plurality of operands or for returning a plurality of results. Furthermore, although three functional units 23, 24, 26 are shown, each with its own connections to instruction issue unit 20 and register file 22 it will be appreciated that in practice more functional units may be present, or fewer, if the functions of different functional units are grouped into a functional units that share common connections to register file 22.

The functional units define an "instruction set" that consists of all types of instructions that can be executed by the processor. As used herein, "instructions" are the basic units of the program that select operations that will be performed by individual functional units. Instructions are the "atoms" of the program that cannot be split further into units that can serve as instructions. Typically, each instruction has a single op code (operation code) that identifies the instruction. As is well known, design of a programmable processor typically starts from the specification of the instruction set, the specification of the instruction set providing the skilled person sufficient information to select at least a basic implementation of the processor.

A first functional unit 23 is a memory access functional unit that is coupled to data memory 28. This memory access functional unit 23 is designed to execute "LOAD" and "STORE" instructions, with operands that specify addresses of locations in data memory 28. Data memory 28 may also be coupled to front end 10 (not shown) and/or back end 14 (not shown) for receiving signal data and transmitting video data. A second functional unit 24 (which may in fact contain a group of functional unit) is designed to execute conventional instructions, such as ALU instructions like ADD, SHIFT etc. Although not shown, further functional units may be present, for example so that several instructions can be executed in parallel, or different instructions can be executed (e.g. input of signal data from front end 10 (not shown) and/or output of video data to back end 14 (not shown)).

The program of the programmable instruction processor provides for de-interleaving of signal data. This is implemented by means of LOAD and STORE instructions that are supplied to memory access functional unit 23. The addresses in data memory 28 that are used by the LOAD and/or STORE instructions for this purpose are determined using operands that are computed by a specialized address update functional unit 26 in response to specialized instructions. Address update functional unit 26 is provided for computing successive addresses for use by LOAD and/or STORE instructions during de-interleaving.

In one embodiment instructions of the type that are executed by address update functional unit 26 can be denoted by

NEXT_ADDRESS R1, R2, R3

In this denotation R1, R2, R3 denote register selection codes that identify registers in register file 22 that are used to provide operands and to write results of the instruction. However, instructions will be described herein colloquially by saying that R1 etc. "is" a register. This should be understood to mean that R1 etc. denotes a selection code that identifies a register in register file 22. Even more colloquially it will be said that R1 etc. "is an operand". This should also be understood to mean that R1 etc. denotes a selection code that identifies a register in register file 22 that contains the operand.

In this denotation NEXT_ADDRESS denotes the op-code that identifies the instruction, R1 is an operand register that contains an old address operand value, R2 is a first result register into which the new address result value will be written, and R3 is a second result register into which a flag result will be written to indicate whether the new address result value is valid.

The new instruction can be used in the following way in a program part that reads data from data memory:

```
REPEAT:
IF R3 LOAD R1, R4, R5
        IF R3 instructions that process the content of R5
NEXT_ADDRESS R1, R1, R3
```

Although the instructions of this program are shown in series, it should be appreciated that in practice one or more of the instructions may be executed in parallel if a multi issue slot processor such as a VLIW processor is used. In this program part the "IF R3" that precedes the first instruction indicates that this first instruction is a guarded instruction (a conditionally executed instruction). By guarded is meant that the operation indicated by the instruction (a LOAD operation) will be executed completely by memory access functional unit 23 only if the operand R3 has a flag value that indicates that the address value in R1 is valid. The normal operands of the LOAD instruction are R1 and R4. R4 contains a base address value and R1 contains the address offset from that base address that is updated with the NEXT_ADDRESS instruction. When the LOAD instruction is executed completely, data is loaded from an address that is the sum of the operands in R1 and R4 and the loaded ata is stored in R5.

Complete execution of instructions that use the loaded data from R5 is also guarded by the flag value in R3. It is not necessary that execution of all of these instructions is guarded: it suffices to guard execution of instructions that would otherwise overwrite useful data.

The NEXT_ADDRESS instruction is executed between successive executions of the LOAD instruction (or each time simultaneously with such an execution). Execution of the NEXT_ADDRESS instruction results in an update of the offset address in R1 and the flag in R3.

Figure 3:
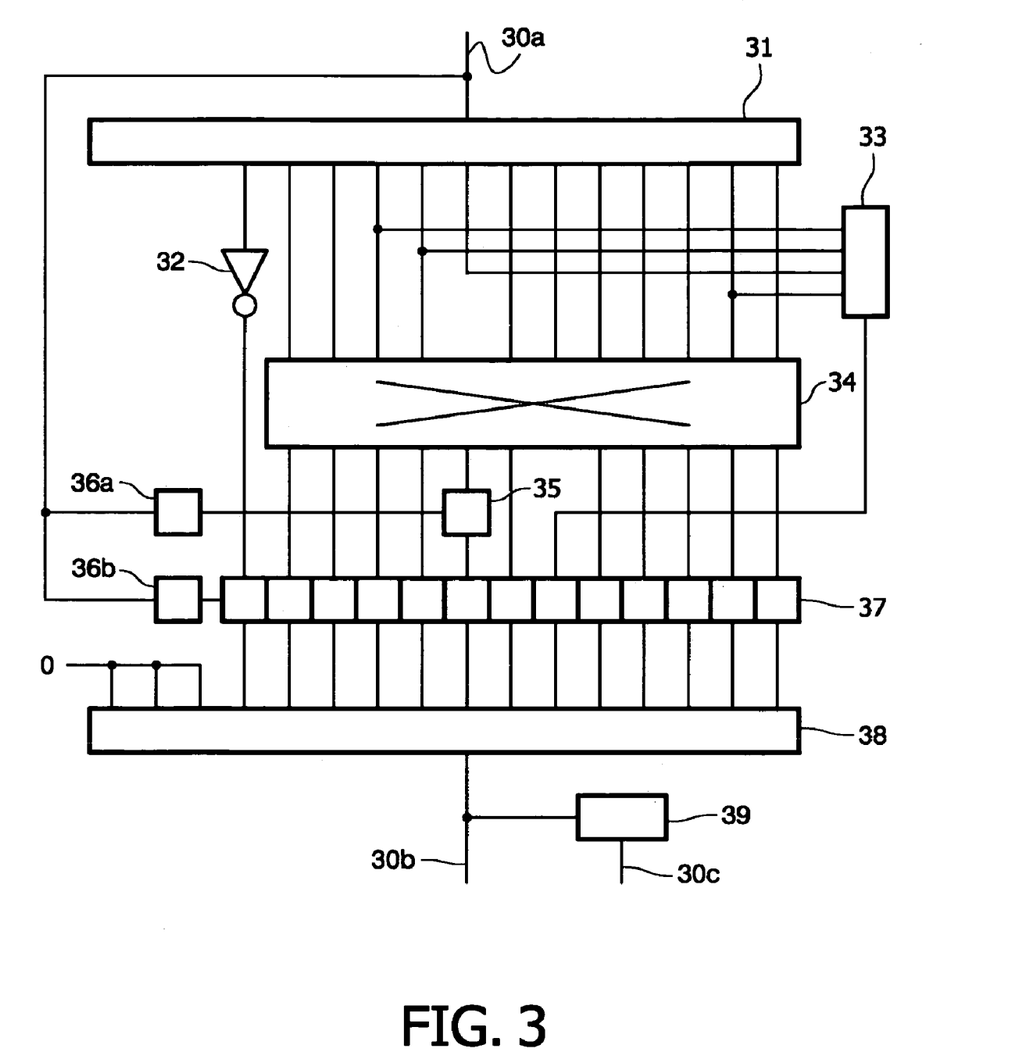
FIG. 3 shows a functional unit

FIG. 3 shows an example of an address update functional unit for executing the NEXT_ADDRESS instruction. The address update functional unit has an operand input 30a and two result outputs 30b,c coupled to ports of register file 22 (not shown). The address update functional unit contains an exclusive OR circuit 33, an inverter 32, a permutation circuit 34, a substitution circuit 35, comparators 36a,b a disable circuit 37 and a result comparator 39. The operand input 30a and the outputs 30b,c typically support N bit wide input and output, wherein N is a word size of the digital signal processor (N=16 bits for example). Typically N conductors are provided in parallel for this purpose, but for the sake of clarity single lines are shown. Units 31, 38 are shown symbolically for splitting out individuals bit lines from the input 30a and output 30b, but it should be appreciated that the conductors that are represented by the inputs and outputs of these units just run on through these units. Alternatively, any one or both of these units may contain a register, to latch data e.g. for pipelining purposes. A number of the bit lines from input unit 31 are coupled to permutation circuit 34, which provides cross-connections between its inputs and outputs according to the following table

| input line # | connected to output line # |
|---|---|
| 0 | 10 |
| 1 | 7 |
| 2 | 4 |
| 3 | 0 |
| 4 | 1 |
| 5 | 11 |
| 6 | 9 |
| 7 | — |
| 8 | 6 |
| 9 | 2 |
| 10 | 8 |
| 11 | 3 |

These connections have been selected so that, in terms of the definition of the de-interleaving addresses for the DVB standard, a combination is performed of a reverse computation of R' from R, an update of R' and a computation of a new R from the updated R'.

The outputs of permutation circuit 34 are coupled to inputs of disable circuit 37, which in turn has outputs coupled to output unit 38. One of the outputs of permutation circuit 34 is coupled to an input of disable circuit 37 via substitution circuit 35. Bit line number 12 from input unit 31 is coupled to bit input number 12 of disable circuit 37 via inverter 32. Exclusive OR circuit 33 receives input signals from input bit lines numbers 1, 7, 8 and 9 and feeds a result to output bit input number 5 of disable circuit 37.

A first comparator 36a has an input coupled to input 30a and an output coupled to a control input of substitution circuit 35. This first comparator 36a is arranged to generate a detection signal when the data value represented by the signal at input 30a represents the number 4096. Substitution circuit 35 is arranged to pass its input signal from permutation circuit 35 unless first comparator 36a signals that the data value at input 30a represents the number 4096. In the latter case substitution circuit supplies a logic 1 instead. Any suitable logic circuit or multiplexing circuit may be used to realize this function.

A second comparator 36b as an input coupled to input 30a and an output coupled to a control input of disable circuit 37. This second comparator 36b is arranged to generate a detection signal when the data value represented by the signal at input 30a represents the number 4226. Disable circuit 37 is arranged to pass its input signals from permutation circuit 35 and substitution circuit 35 unless second comparator 366b signals that the data value at input 30a represents the number 4226. In the latter case substitution circuit supplies logic zero's at all its outputs. Any suitable logic circuit or multiplexing circuit may be used to realize this function.

Result comparator 39 compares the number that is represented by the result that is output from output unit 38 with the number 6048. Result comparator 39 produces a further result that indicates whether the number that is represented by the result exceeds 6048. The result from output unit 38 corresponds to the result that is written to R1 in the preceding examples and the further result from result comparator 39 corresponds to the result that is written to R3 in the preceding examples.

It may be noted that, although the input of result comparator 39 is shown connected to result output 30b, its input may alternatively be connected to the input of disable circuit 37, and with respect to the bit that passes via substitution circuit 35 even with the input of the substitution circuit. In this case, the delay caused by result comparator 39 does not add onto the delay caused by substitution circuit 35 and/or disable circuit 37, which reduces the minimum possible duration of the instruction cycle. Result comparator circuit 39 may even be designed so that the delay from its input that receives the output of exclusive OR circuit 33 is shorter than that from one or more of the remaining bits. This reduces the minimum instruction cycle duration even further.

In operation, when a series of NEXT_ADDRESS instructions is executed wherein each instruction has an old address operand that is the new address result of a preceding instruction in the series, instruction executions by the functional unit generate a series of numbers that contains numbers that can be used to compute addresses for de-interleaving data. In response to the same instructions the functional unit generates further results that indicate whether the results can be used. This avoids the need to execute separate instructions for this purpose.

Initialization and restart of the cycle of addresses is performed by the functional unit on the basis of the value of its old address operand, i.e. without additional information to indicate whether the cycle has ended. To realize this. when the value 4226 is encountered, second comparator 36b causes the number to be reset to zero, to start a new cycle of numbers. When the NEXT_ADDRESS instruction uses this zero value as old address operand, its result is 4096. When the NEXT_ADDRESS instruction uses this result as old address operand first comparator 36a detects this value and introduces the first non-zero less significant bit value in the cycle. It may be noted that only the old address operand is used for this purpose: no retained state information from the functional unit is used for this purpose. As result, the functional unit may be used to execute instructions for generating different address series interleaved with one another. Thus, for example, different program threads with de-interleaving functions can execute concurrently, for example to decode two DVB signals in parallel.

In the illustrated embodiment, the result and the further results are produced as separate results, that can be written to separate registers that can be selected independently of one another under control of the instructions. This results in maximum flexibility for programming de-interleaving. These registers may be registers in the same register file, or in separate register files (with mutually different bit-widths for example). In another embodiment (not shown), the further result may be inserted in the result, for example at the most significant bit position (e.g. at bit number 15 or 31). In this case a simpler instruction results, which can be symbolically represented by

NEXT_ADDRESS R1, R2

In this instruction only one result register address R2 is needed to indicate a register for writing data that contains both the result and the further result. When this register is used for a LOAD or STORE instruction the memory access unit may be arranged to ignore the additional bit during address determination. Even if the bit is used in this computation, it need not cause any problems, when the instructions that use the result for address determination are executed conditionally under control of the further result.

As an alternative, the further result and result comparator 39 may be omitted altogether. In this case execution of a separate comparison instruction is needed to perform de-interleaving:

```
    REPEAT:
IF R3 LOAD R1, R4, R5
                 IF R3 instructions that process the content of R5
NEXT_ADDRESS R1, R1
COMPARE R1, #MAX, R3
```

Herein #MAX is a constant equal to 6048 with which the content of R1 is compared. Compared to the embodiment of FIG. 3 this requires additional occupation of a comparator functional unit for an instruction cycle. On the other hand it simplifies the design of the functional unit for computation of the successive addresses.

It should be appreciated that the structure that has been shown in FIG. 3 is only one example of a functional unit that can be used for this purpose. It will be understood that if a different address series is needed, a correspondingly different circuit may be provided in the functional unit, instead of the circuit of FIG. 3. For example, for decoding different DVB data, three different block sizes have been defined, each with its own series of addresses for use during de-interleaving. For each type of decoding a different structure may be used in the functional unit.

Alternative different circuits may even be used to implement the same de-interleaving operation. For example, without affecting the generated numbers, the connections between various units may be varied. Since permutation circuit 35 merely performs a bit-for-bit connection function, it may be placed anywhere relative to exclusive OR circuit 33, substitution circuit 35 or disable circuit 37. Similarly, because comparators 36a,b trigger on different addresses, the sequence of substitution circuit 35 and disable circuit 37 may be exchanged.

Furthermore, it should be realized that de-interleaving can be realized in many different ways in which different series of addresses may be used, for which a different implementation of the functional unit may be used. For example, de-interleaving can be realized with a first implementation by storing at addresses with address values that increment with fixed steps and loading using addresses determined using a series generated by the functional unit. The same de-interleaving operation may be realized by a second implementation that comprises storing using addresses determined using a series generated by a functional unit, and loading with address values that increment with fixed steps. The first and second implementation can be used to realize the same de-interleaving operation. Similarly if, instead of increasing address value, address values are used that decrease with fixed step, a correspondingly different functional unit may be provided. As a further alternative differently generated series of addresses may be used both for reading and writing.

In an embodiment the functional unit is designed to combine the ability to generate a plurality of different address sequences, the specific address sequence being selected by the instruction. By way of example, one functional unit may be provided that can be used for generation of addresses for different block sizes during DVB decoding. In one embodiment the type of sequence is selected by the operation code of the instruction. This case three different operation codes are provided, for three different kinds of instruction. Invocations of these instructions may be represented by

| NEXT_ADDRESS_1 | R1, R2, R3 |
| NEXT_ADDRESS_2 | R1, R2, R3 |
| NEXT_ADDRESS_3 | R1, R2, R3 |

Each instruction results in a different computation of the result that is passed to register R2 and a comparison of that result with a different number, to produce a further result that is passed to R3. Alternatively, a single type of comparison may be used for each type of address computation, wherein a further operand is used to select between the different computation.

Figure 4:
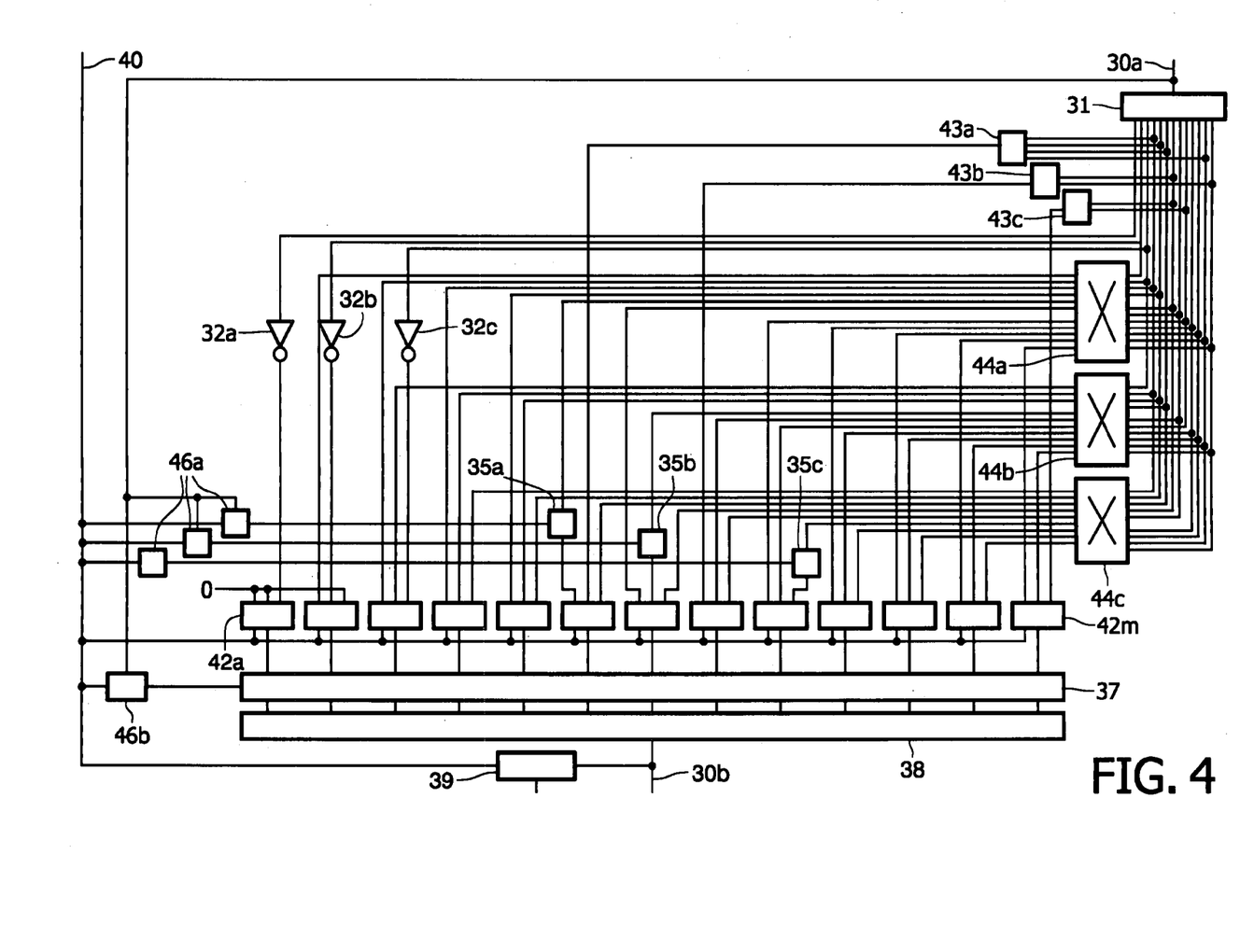
FIG. 4 shows a further functional unit

FIG. 4 shows an embodiment of such a functional unit. In this embodiment the units that have the same numbers as in FIG. 3 have the same function as in FIG. 3. In this embodiment an operation control input 40 and a series of multiplexers 42a-m (only two labelled explicitly) is provided. Multiplexers 42a-m are used to select between three different addresses. Multiplexers 42a-m receive a control signal from control input 40, to control which of their three input signals will be passed. Three permutation circuits 44a-c are provided, which connect between input unit 31 and respective inputs of multiplexers 42a-m For DVB decoding the connections of these permutation circuits may be as specified in the following table

| input line # | output line # of 44c | output line # of 44b | output line # of 44c |
|---|---|---|---|
| 0 | 10 | 3 | 7 |
| 1 | 7 | 2 | 8 |
| 2 | 4 | 4 | 6 |
| 3 | 0 | 6 | 4 |
| 4 | 1 | 9 | — |
| 5 | 11 | 8 | 1 |
| 6 | 9 | — | 9 |
| 7 | — | 10 | 5 |
| 8 | 6 | 1 | 2 |
| 9 | 2 | 0 | 3 |
| 10 | 8 | 5 | — |
| 11 | 3 | — | — |

The outputs of the permutation circuits 44a-c are coupled to inputs of the multiplexers 42a-m, the control signal from control input 40 determining from which permutation circuit 44a-c the output signals will be passed to the result.

Three exclusive OR circuits 43a-c are provided, with outputs coupled to a first input of a multiplexer 42a-m for bit number 5, a second input of a multiplexer 42a-m for bit number 7 and a third input for bit number 0 respectively. Three substitution circuits 35a-c are provided, coupled to a first input of a multiplexer 42a-m for bit number 7, a second input of a multiplexer 42a-m for bit number 6 and a third input for bit number 4 respectively. The three substitution circuits 35a-c are controlled by a first comparator circuit 46a that compares the number represented by the input operand with a value that depends on the control signal from control input: substitution circuits 35a-c are activated when this number is 4096, 2048 and 1024 respectively. Disable circuit 37 is coupled between the outputs of multiplexers 42a-m and result output 30b. Disable circuit 37 is controlled by second comparator 46b, which forces an all zero output of disable circuit when the input operand represents the number 4226, 2056 or 1032 respectively, dependent on whether the control signal from control input 40 selects outputs from first, second or third permutation circuit 44a-c respectively.

Result comparator 39 compares the result with 6048, 3024 or 1512 respectively, dependent on whether the control signal from control input 40 selects outputs from first, second or third permutation circuit 44a-c respectively. As in the single series embodiment of FIG. 3, a comparator circuit may be provided with inputs coupled to the inputs of multiplexers 42a-m, and to the input of substitution circuits 35a-c for the bits where these circuits precede the multiplexers 42a-m.

Inverters 32a-c are provided that couple respective lines from input unit 31 to respective ones of multiplexers 42a-m, so that, dependent on the control signal from control input 40 either one of the following combinations of signals are passed by the multiplexers for the most significant bits:

(a) logic zeros at the multiplexers 24a-m for the two most significant bit outputs, and the inverse of bit number 9 from input unit 31 at the multiplexer 24a-m for the third bit output in order of decreasing significance (b) a logic zero at the multiplexer 24a for the most significant bit output, the inverse of bit number 10 from input unit 31 at the multiplexer for the second bit output in order of decreasing significance and an output from permutation circuit 42b at the multiplexer for the third bit output in order of decreasing significance; or (c) the inverse of bit number 11 from input unit 31 at the multiplexer for the first bit output in order of decreasing significance and outputs from permutation circuit 42a at the multiplexers for the second and third bit outputs in order of decreasing significance.

As will be appreciated the functional unit of FIG. 4 can be used to generate any number of series of addresses interleaved with one another, where any of the series may be of any one of three different types.

Although the invention has been described with respect to specific embodiments, it will be appreciated that the invention is not limited to these embodiments. For example, although an application to de-interleaving has been described (recovering an original sequence upon reception), it should be appreciated that the invention may be applied to interleaving as well (rearranging a sequence before transmission), since these operations involve the same type of processing. In fact, the same type of functional unit may be used both for interleaving and for de-interleaving of the same type of code, the one involving writing at addresses according to a generated series and reading at addresses at fixed distances, the other involving writing to addresses at fixed distances and reading from addresses according to this generated series.

The invention claimed is:

1. A method of de-interleaving a signal, the method comprising
    extracting data from the signal;
    storing the extracted data in a data memory (28) and reading the stored extracted data from the data memory (28) after said storing;
    computing addresses, for use in said storing and/or reading, from preceding addresses that have been used for said storing and/or reading, by means of repeated execution of a program loop that contains an address update instruction for computing the addresses, the address update instruction defining locations of an old address operand and a new address result, the new address result being formed in response to at least part of the executions of the address update instruction by permuting positions of a plurality of bits from the old address operand and forming of a bit of the new address result as a logic function of a combination of bits from the old address operand.

2. A method according to claim 1, comprising
determining, in response to each execution of the address update instruction, whether a number represented by the new address result operand exceeds a threshold value;
writing a flag result that indicates whether the number represented by the new address result operand exceeds a threshold value, to a flag location that is addressed by the address update instruction;
using the flag result from the flag location to condition execution of a further instruction in said loop that uses the new address result as operand.

3. A method according to claim 1, comprising
starting repeated cycles, each of a same series of addresses for use in said storing and/or reading, during execution of the program loop implicitly in response to execution of the address update instruction by deviating from said permuting and forming of the bit to form the new address result when the old address operand has a predetermined value.

4. A method according to claim 1 comprising receiving a DVB signal and de-interleaving data from the DVB signal.

5. A programmable signal processing circuit, comprising
an operand storage circuit (22);
an instruction processing circuit (23, 24, 26), for executing instructions that address locations of operands and results in the operand storage circuit (22), an instruction set of the instruction processing circuit comprising an address update instruction, the instruction processing circuit (23, 24, 26) having an operand input (30a) for receiving an old address operand of the address update instruction from the operand storage circuit (22) and a result output (30b) for writing a new address result of the address update instruction to the operand storage circuit (22), the instruction processing circuit (23, 24, 26) comprising
a permutation circuit (34) coupled between the operand input (30a) and the result output (30b) and arranged to control values of a plurality of bits at respective output bit positions in the new address result dependent on respective bits from respective input positions that are a permutation of the output bit positions, and
a combinatorial logic circuit (33) coupled between the operand input (30a) and the result output (30b), with inputs coupled to receive bits from respective input bit positions in the old address operand and an output coupled to output a bit to a bit position in the new address result.

6. A programmable signal processing circuit according to claim 5, wherein the instruction processing circuit (23, 24, 26) comprises
a comparator circuit (36a) with an input coupled to the operand input (30a) and an output;
a bit substitution circuit (35) coupled in series with the permutation circuit (34), with a control input coupled to the output of the comparator circuit (36a) and arranged to substitute a predetermined bit value at one of said plurality of output positions when the comparator circuit (36a) indicates that the old address operand contains a predetermined combination of bit values.

7. A programmable signal processing circuit according to claim 6, wherein the instruction processing circuit (22, 24, 26) comprises
a further comparator circuit (36b) with an input coupled to the operand input (30a) and an output;
a further bit substitution circuit (37) coupled in series with the permutation circuit (34), with a control input coupled to the output of the further comparator circuit (36b) and arranged to substitute predetermined bit values at said plurality of output positions when the further comparator circuit (36b) indicates that the old address operand contains a further predetermined combination of bit values.

8. A programmable signal processing circuit according to claim 6, wherein the instruction processing circuit (23, 24, 26) comprises
a further result output (30c) for writing a flag result of the address update instruction to the operand storage circuit (22);
a comparator circuit (39) with an input coupled to receive information derived from the operand input (30a) and an output coupled to the further result output (30c) and arranged to set a flag dependent on whether or not the information indicates that the value represented by the new address result exceeds a predetermined value.

9. A programmable signal processing circuit according to claim 6, wherein the instruction processing circuit (23, 24, 26) has a input (40) for receiving update type information that is specified by the address update instruction and the instruction processing circuit (23, 24, 26) being arranged to select a type of update dependent on the update information.

10. A programmable signal processing circuit according to claim 6, comprising an addressable memory (28), programmable signal processing circuit being programmed with a program to de-interleave received data, the program containing a call of the address update instruction in a program loop, the program loop containing a load and/or store instruction that addresses the new address results from said call as memory access operands to determine addresses of memory locations in the addressable memory (28).

* * * * *